United States Patent Office

2,997,499
Patented Aug. 22, 1961

2,997,499
NITROSAMINOPHENYL METHYLCARBAMATES
Warren W. Kaeding, Concord, Calif., assignor to The Dow Chemical Company, Midland, Mich., a corporation of Delaware
No Drawing. Filed May 31, 1960, Ser. No. 32,532
6 Claims. (Cl. 260—479)

This invention is directed to carbamate compounds and more particularly to certain N-alkyl-substituted N-nitroso-p-aminophenyl methylcarbamates represented by the formula

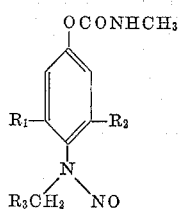

In this and succeeding formulas, $R_1$ and $R_2$ are independently selected from the group consisting of hydrogen and methyl and $R_3$ is selected from the group consisting of hydrogen and alkyl radicals containing from 1 to 7 carbon atoms.

The compounds of the present invention are white or light-colored liquids or crystalline solids, soluble in many organic solvents such as benzene, toluene, xylene, methylene chloride, carbon tetrachloride, alcohols, acetone, and dimethylformamide, and substantially insoluble in water.

The compounds of the present invention have many biological applications. These compounds are useful as parasiticides and are particularly adapted to be employed for the control of insects. The compounds are also useful for the control of bacteria and fungi, as well as other terrestrial and aquatic pests. They are particularly useful for the control of aquatic weeds and plants.

The methylcarbamates of the present invention may be prepared by nitrosating a monolkyl aminophenol compound having the structure

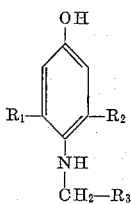

with nitrous acid (sodium nitrite + mineral acid) to produce an intermediate alkylnitrosaminophenol compound having the structure

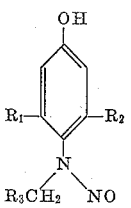

followed by the reaction of the latter with methyl isocyanate.

In carrying out the first step of the reaction, an aqueous solution of sodium nitrite is added portionwise and with stirring to a solution of a substantially equimolar proportion of an appropriate monoalkylaminophenol compound and excess hydrochloric acid in an appropriate solvent at a temperature of from about —10° to about 25° C. Suitable solvents include ethanol, methanol, isopropyl alcohol and alcohol-water mixtures. The reaction mixture is stirred in the temperature range for a period of from about 0.5 to about 20 hours to produce an alkyl nitrosaminophenol intermediate which precipitates in the reaction mixture. The intermediate may then be recovered by filtration and purified, if desired, by conventional procedures such as washing or recrystallization.

In carrying out the second step of the reaction, a substantially equimolar proportion or slight excess of methyl isocyanate is added to the alkyl nitrosaminophenol intermediate prepared as above described at a temperature of from 20° to 35° C. for a period of from 2 to 48 hours. The reaction is preferably carried out in the presence of a catalytic amount of a tertiary amine and in an inert solvent. Suitable tertiary amine catalysts include triethylamine, picoline, collidine and pyridine. Preferred solvents are methylene chloride, pentane and hexane although the liquid amine catalyst may also serve as solvents. As a result of these operations, the desired alkyl nitrosaminophenyl methylcarbamate product is formed and remains in solution if solvent is employed. The product may be recovered as residue by evaporating or distilling off the solvent. The product may then be purified by washing or decolorizing a solution thereof with activated charcoal and if solid, by recrystallization from a suitable solvent such as pentane, hexane, carbon tetrachloride or isooctane.

The following examples illustrate the invention but are not to be construed as limiting.

*Example 1.—4-(methyl nitrosamino)phenyl methylcarbamate*

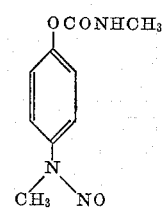

20.3 grams (0.294 mole) of sodium nitrite in aqueous solution was added dropwise at 25° C. to a solution of 50 grams (0.145 mole) of 4-methylaminophenol sulfate (sulfuric acid salt of p-methylaminophenol) in 800 milliliters of water containing 2 milliliters of concentrated sulfuric acid. As a result of this operation, a reaction took place with the formation of a 4-(methyl nitrosamino)phenol intermediate which precipitated in the reaction mixture forming a heavy slurry. The precipitated 4-(methyl nitrosamino)phenol intermediate was recovered by filtration and washed with water. The intermediate melted from 135° to 137° C.

3.1 milliliters (0.045 mole) of methyl isocyanate and a few drops of triethylamine catalyst were added to a solution of 7.5 grams (0.049 mole) of 4-(methyl nitrosamino)phenol above prepared in 400 milliliters of methylene chloride-ether solvent mixture. The reaction mixture was allowed to stand overnight at room temperature. At the end of this period, the volume of solvent was reduced by boiling and pentane added to the resulting solution precipitate as light tan crystals, the desired 4-(methyl nitrosamino)phenyl methylcarbamate product having a melting point of 138°–139° C. The product had elemental analyses as follows:

|         | Carbon | Hydrogen | Nitrogen |
|---------|--------|----------|----------|
| Theory  | 51.67  | 5.30     | 20.09    |
| Found   | 51.67  | 5.24     | 20.15    |

Example 2.—4-(methyl nitrosamino)3,5-xylyl methyl-carbamate

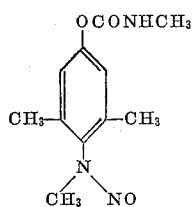

A saturated aqueous solution of 4 grams (0.058 mole) of sodium nitrite was added slowly to a solution of 8.6 grams (0.057 mole) of 4-methylamino-3,5-xylenol and 17 milliliters of concentrated hydrochloric acid in a mixture of 200 milliliters of water and 100 milliliters of ethanol maintained at about 15° C. As a result of the addition, a 4-(methyl nitrosamino)-3,5-xylenol intermediate precipitated in the reaction mixture as yellow crystalline solid. The latter was recovered by filtration and found to melt from 143° to 145° C.

5.3 milliliters (0.093 mole) of methyl isocyanate and a few drops of triethylamine catalyst were added to a solution of 15 grams (0.083 mole) of 4-(methyl nitrosamino)-3,5-xylenol in 300 milliliters of methylene chloride. The reaction mixture was allowed to stand overnight at room temperature and the volume of the mixture thereafter reduced by boiling off part of the solvent. As a result of these operations, a 4-(methyl nitrosamino)-3,5-xylyl methylcarbamate product precipitated as a white crystalline solid. The product was recovered by filtration and was found to melt at 119°–120° C. The product had elemental analyses as follows:

|         | Carbon | Hydrogen | Nitrogen |
|---------|--------|----------|----------|
| Theory  | 55.68  | 6.37     | 17.71    |
| Found   | 55.70  | 6.64     | 17.73    |

Example 3.—4-(isobutyl nitrosamino)-3,5-xylyl methyl-carbamate

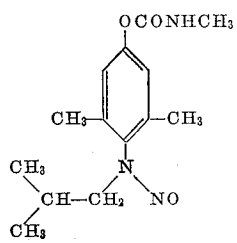

10 grams (0.052 mole) of 4-isobutylamino-3,5-xylenol was added to 2.5 liters of water and 8 milliliters of concentrated hydrochloric acid and the resulting mixture warmed to form a homogeneous solution. The mixture was then cooled to 0° C. and an aqueous solution of 3.65 grams (0.053 mole) of sodium nitrite added dropwise thereto. The resulting mixture was stirred for several hours to obtain a 4-(isobutyl nitrosamino)-3,5-xylenol intermediate as a solid melting at 70°–71° C.

2.7 milliliters (0.047 mole) of methyl isocyanate and a few drops of triethylamine catalyst were added to a solution of 7 grams (0.031 mole) of 4-(isobutyl nitrosamino)-3,5-xylenol intermediate above prepared in approximately 60 milliliters of methylene chloride. The reaction mixture was allowed to stand for 2 days at room temperature to obtain a 4-(isobutyl nitrosamino)-3,5-xylyl methylcarbamate product as a white crystalline solid melting from 148° to 150° C.

Example 4.—4-(2-ethylbutyl nitrosamino)-3,5-xylyl methyl-carbamate

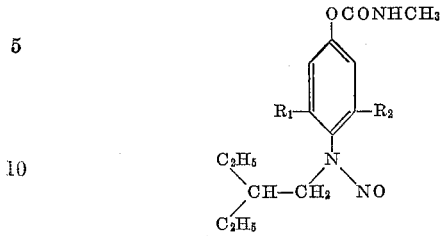

In a manner similar to that previously described, 4-(2-ethylbutylamino)-3,5-xylenol was reacted with sodium nitrite in aqueous acid solution to produce 4-(2-ethylbutyl nitrosamino)-3,5-xylenol intermediate as a white solid melting at 119°–120° C.

7.7 milliliters (0.135 mole) of methyl isocyanate and a few drops of triethylamine catalyst were added to a solution of 20 grams (0.08 mole) of the 4-(2-ethylbutyl nitrosamino)-3,5-xylenol intermediate above prepared in 200 milliliters of methylene chloride to obtain a 4-(2-ethylbutyl nitrosamino)-3,5-xylyl methylcarbamate product as a white crystalline solid melting from 58° to 60° C.

Example 5.—4-(2-methylpentyl nitrosamino)-3,5-xylyl methyl-carbamate

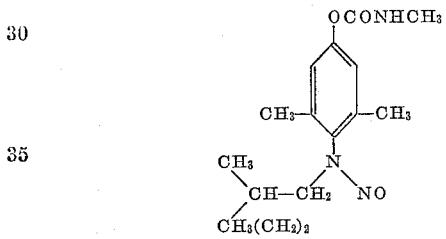

In a manner similar to that previously described, 4-(2-methylpentylamino)-3,5-xylenol was reacted with sodium nitrite in aqueous acid solution to produce a 4-(2-methyl-pentyl nitrosamino)-3,5-xylenol intermediate as a white solid melting from 57° to 59° C.

3.4 milliliters (0.06 mole) of methyl isocyanate and a few drops of triethylamine catalyst were added to a solution of 10 grams (0.04 mole) of the 4-(methylpentyl nitrosamino)-3,5-xylenol intermediate above prepared in 100 milliliters of methylene chloride. The reaction mixture was allowed to stand overnight at room temperature and thereafter most of the solvent removed by vacuum distillation to obtain a 4-(methylpentyl nitrosamino)-3,5-xylyl methylcarbamate product as a light yellow oily residue. The latter had a refractive index, $n_D^{22.5}$ of 1.5255.

Example 6

In similar preparations, the following compounds are prepared:

4-(normal-pentyl nitrosamino)phenyl methyl-carbamate by the reaction of nitrous acid on 4-normal-pentyl-aminophenol to produce an intermediate 4-(normal-pentyl nitrosamino)phenol followed by the reaction of the latter with methyl isocyanate.

4-(2-methylbutyl nitrosamino)phenyl methyl-carbamate by the reaction of nitrous acid on 4-(2-methyl-butylamino)phenol to produce an intermediate 4-(2-methylbutyl nitrosamino)phenol followed by the reaction of the latter with methyl isocyanate.

4-(2,2-dimethylpropyl nitrosamino)phenyl methyl-carbamate by the reaction of nitrous acid on 4-(2,2-dimethyl-propylamino)phenol to produce an intermediate 4-(2,2-dimethylpropyl nitrosamino)phenol followed by the reaction of the latter with methyl isocyanate.

4-(normal-octyl nitrosamino)phenyl methyl-carbamate by the reaction of nitrous acid on 4-normal-octyl-aminophenol to produce an intermediate 4-(normal-octyl nitrosamino)phenol followed by the reaction of the latter with methyl isocyanate.

4-(normal-heptyl nitrosamino)-3,5-xylyl methylcarbamate by the reaction of nitrous acid on 4-normal-heptylamino-3,5-xylenol to produce an intermediate 4-(normal-heptyl nitrosamino)-3,5-xylenol followed by the reaction of the latter with methyl isocyanate.

The products of the present invention are useful as pesticides. In such use, they may be employed to control undesirable water plants and weeds. They are further useful for the control of insects and other pests infesting plants and soil.

In a representative operation of its use as an aquatic herbicide, 4-(2-ethylbutyl nitrosamino)-3,5-xylyl methylcarbamate and 4-(2-methylpentyl nitrosamino)-3,5-xylyl methylcarbamate were employed for the control of submersed and floating aquatic weeds such as Elodea, Cabomba, moneywort Salvina and coontail species. In such operations, excellent controls of these species were obtained when the aquatic weeds were exposed in separate operations for 400 hours to tanks containing 10 parts by weight of one of the methylcarbamate compounds per million parts of aqueous medium.

In a representative operation for the control of soil-infesting pests, 4-(methyl nitrosamino)phenyl methylcarbamate was dispersed in water to prepare a composition containing 10 parts by weight of the methylcarbamate compound per million parts of dispersion. This composition gave substantially complete control of larvae of the root-knot nematode (Meloidogyne species) contacted therewith.

The methylcarbamates are further extremely effective for the control of parasitic organisms found in the aerial portions of growing plants and inclusive of aphids, mites, plant pathogens and insects. These compounds have been found to have activity against chewing-type insects as represented by Mexican bean beetle, southern army worm and plum curculio.

The reactant monoalkylaminophenols to be employed in the preparation of the compounds of the present invention may be prepared by reacting an appropriate aminophenol with substantially equimolar proportions or slight excess of an appropriate aliphatic aldehyde, $R_3CHO$, at a temperature in the range of from 15° to 60° C. for a period of from about 5 to 30 minutes to produce a Schiff base phenol; thereafter, reacting the Schiff base phenol with hydrogen in the presence of palladium on charcoal catalyst at a temperature of from 10° to 75° C. and a pressure of from 10 to 50 pounds per square inch to produce a monoalkylaminophenol. The sequence of reactions may be represented by the following equations:

(1) 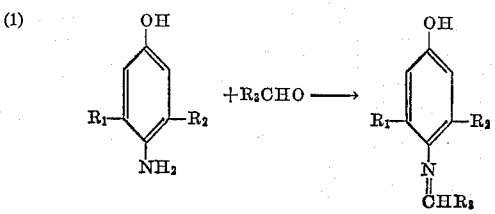

(2) 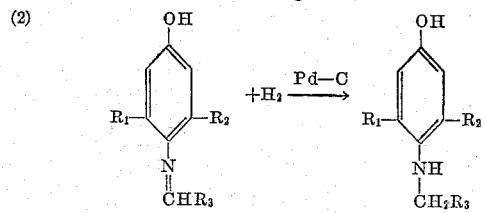

Alternatively, when the monoalkylaminophenol reactant is a methylaminophenol, the appropriate aminophenol is reacted with a substantially equimolar proportion of a dimethyl sulfate at ambient temperature for from about 0.5 to 2 hours to produce the methyl sulfate salt of a monomethylaminophenol; thereafter, the salt is neutralized with dilute alkali to produce the desired monomethylaminophenol. The sequence of reactions may be represented by the following equations:

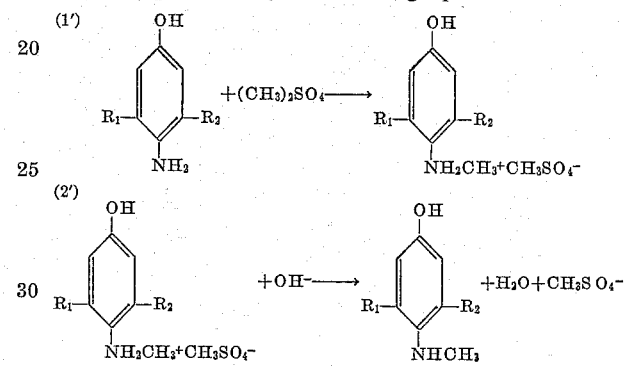

I claim:
1. A compound having the structure

$$\begin{array}{c} OCONHCH_3 \\ \diagup\!\diagdown \\ R_1-\!\!\!\diagdown\!\!\diagup\!\!-R_2 \\ | \\ N \\ R_3CH_2\diagup\ \diagdown NO \end{array}$$

wherein $R_1$ and $R_2$ are independently selected from the group consisting of hydrogen and methyl and $R_3$ is selected from the group consisting of hydrogen and alkyl radicals containing from 1 to 7 carbon atoms, inclusive.

2. 4-(methyl nitrosamino)phenyl methylcarbamate.
3. 4-(methyl nitrosamino)-3,5-xylyl methylcarbamate.
4. 4-(isobutyl nitrosamino)-3,5-xylyl methylcarbamate.
5. 4-(2-ethylbutyl nitrosamino) - 3,5 - xylyl methylcarbamate.
6. 4-(2-methylpentyl nitrosamino) - 3,5 - xylyl methylcarbamate.

References Cited in the file of this patent
UNITED STATES PATENTS
2,933,383     Lambrech _____ Apr. 19, 1960

OTHER REFERENCES
Kolbezen et al.: J. Agr. and Food Chemistry, vol. 2, pp. 864–70, 1954.